Figure 1:
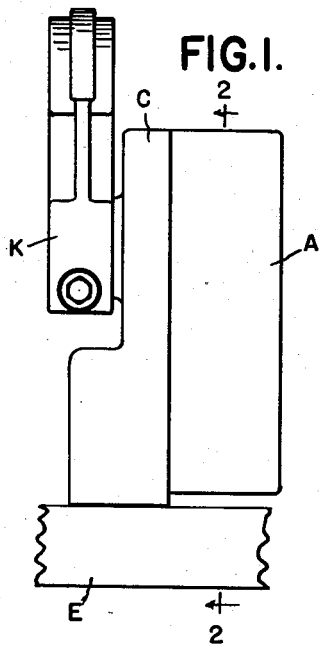

Sept. 16, 1952　　　　　J. H. BRODHUN　　　　　2,610,649
SNAP-ACTION VALVE
Filed April 18, 1949

*INVENTOR.*
JOHN HENRY BRODHUN
BY
*Whittemore Hulbert & Belknap*
ATTORNEYS

Patented Sept. 16, 1952

2,610,649

UNITED STATES PATENT OFFICE 2,610,649

SNAP-ACTION VALVE

John Henry Brodhun, Birmingham, Mich., assignor to The Gear Grinding Machine Company, Hamtramck, Mich., a corporation of Michigan Application April 18, 1949, Serial No. 88,160

5 Claims. (Cl. 137—701)

1

The invention relates to valves for controlling the flow of fluid and has for its object the obtaining of a construction in which a substantially instantaneous shifting of the valve is accomplished. To this end the invention consists in the construction as hereinafter set forth.

Figure 2:
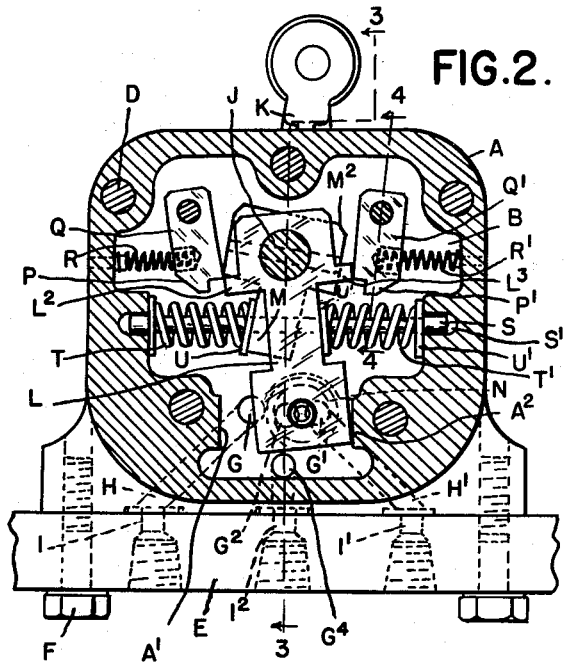
Figure 3:
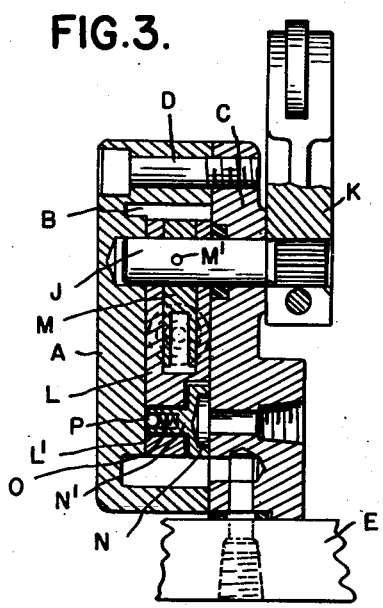
Figure 4:
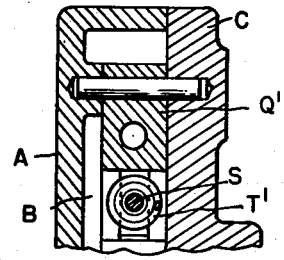

In the drawings:

Figure 1 is a side elevation of the valve;
Figure 2 is a section on line 2—2, Figure 1;
Figure 3 is a section on line 3—3, Figure 2; and
Figure 4 is a section on line 4—4, Figure 2.

A is a housing member having a chamber B therewithin, which is closed by a flat-faced bracket member C, to which the housing A is attached by screws D. The member C is mounted on a base E by screws F. The member C is also provided in its inner face with a plurality of ports G, G', $G^2$. The ports G, G' connect through channels H and H' with passages I and I' through the base having threaded sockets for connection with conduits (not shown). There is also a port $G^4$ in the inner face of the member C connecting with a central passage $I^2$ in the base, also provided with a threaded socket for connection with a conduit. The port $G^2$ communicates with a threaded socket in the rear of the member C for connection with another conduit (not shown).

J is a rock shaft engaging bearings in the members C and A and connected at its outer end with an operating rock arm K. Within the chamber B is a rockable member L which is freely pivoted on the shaft J and extends downward over the ports G, G', $G^2$. The upper portion of the member L, which engages the shaft J, is bifurcated to embrace a rockable member M fixed to the shaft J by a pin M'. At its lower end the member L is recessed to receive a button-shaped valve member N having a shank portion N' engaging a bore L' in the member L. The valve N is centrally recessed and is adapted to slide over the inner face of the member C to alternatively establish communication between the ports G, G' and a central port $G^2$. The shoulders A' and $A^2$ at opposite sides of the recess B limit the movement of the member L so that one of the ports G, G' will be external to the valve when the other is connected with the port $G^2$. The valve is pressed against the face of the member C by a spring O in the bore L' between the shank N' and the ball P bearing against the bottom face of the recess B. The upper portion of the member L has fingers $L^2$ and $L^3$ projecting from opposite sides thereof adapted to respectively engage pivotal latch members Q and Q'. The upper portion $M^2$ of the member M is fashioned to alternatively disengage the latch members Q and Q' from their respective fingers P and P', after a predetermined rocking movement of said member M. Springs R and R' press the latch members Q and Q' towards finger engaging position. Extending transversely across the chamber B between the shaft J and the valve N is a rod S having sleeved thereon, on opposite sides of the members L and M, coil springs T and T'. The rod S engages notches S' in the housing A, which are closed by the bracket C, and the central portion of the rod passes through a slot in the member M. The springs are loaded and bear against washers U and U' which overlap the adjacent portions of the members L and M. Thus when the member L is held in one of its positions of adjustment, as by the engagement of the latch Q with the finger $L^2$, the spring T' will be compressed to a greater extent than the spring T. If, however, the member M is rocked by the actuation of the member K, this will carry the washer U away from the member L so as to relieve the latter of its pressure, but the member L will be held from movement by the latch Q. After a certain degree of movement, the portion $M^2$ of the member M will disengage the latch Q whereupon the compressed spring T' will snap the member N to its opposite position of adjustment, and the engagement of the latch Q' with the finger $L^3$ will lock it in this position. The face of said valve and the port face against which it abuts are finished to form a sealing engagement with each other.

In use the passage $I^2$ is connected by suitable conduit with a source of fluid under pressure, which fills the chamber B within the housing A. The passages I and I' are connected to a motor or other device to be controlled by the valve and the port $G^2$ is connected with the return conduit or exhaust. Whenever the shaft J is actuated by the rock arm K it will first relieve the pressure of one of the springs T, T', and will then release the holding latch so that the other spring will snap the member L and valve N to its opposite position. An overmovement of the shaft J will produce no detrimental effect as this shaft is not directly connected to the valve.

What I claim as my invention is:

1. A snap action operating mechanism comprising a rock shaft, an arm secured thereto to rock therewith, an adjacent arm pivoted upon said shaft to be freely rockable thereon between two spaced positions, a pair of detents for holding the latter rock arm in each of said positions, resilient means upon opposite sides of and in the paths of movement of said rock arms for respectively urging said freely pivoted arm in opposite directions, said first mentioned rock arm being adapted by the rocking thereof to relieve the resilient pressure from one side of the freely pivoted rock arm simultaneously storing additional energy in said resilient means, and also to release the detent restraining movement by the opposite resilient means.

2. The construction as in claim 1 having the freely pivoted rock arm bifurcated to embrace the shaft attached rock arm and form bearings on opposite sides thereof for said resilient means.

3. The construction as in claim 2 having the resilient means formed by helical springs and a guide rod for said springs passing axially therethrough beyond the limits of movement of said fixed rock arm and between the furcations of the other arm.

4. The construction as in claim 3 having a member in which said shaft is journaled presenting a flat side and having a plurality of channels therein communicating with ports opening through said flat side, a valve carried by said freely pivoted rock arm controlling said ports, and a casing surrounding said rock arms and valve and sealed to said flat side and forming a fluid pressure chamber.

5. The construction as in claim 4 in which the first mentioned member forms a bracket, and a channeled base on which that said bracket is mounted having the channels thereof located to connect with the channels from said bracket member.

JOHN HENRY BRODHUN.

REFERENCES CITED

The following references are of record in the file of this patent:

UNITED STATES PATENTS

| Number | Name | Date |
| --- | --- | --- |
| 1,642,141 | Carrey | Sept. 13, 1927 |
| 1,956,520 | Weidman | Apr. 24, 1934 |
| 1,974,310 | Lappin | Sept. 18, 1934 |
| 2,075,959 | Previti | Apr. 6, 1937 |
| 2,084,804 | Henion | June 22, 1937 |
| 2,352,815 | Van Valkenburg | July 4, 1944 |
| 2,431,929 | Goff | Dec. 2, 1947 |